Nov. 15, 1955
H. D. PETCH
2,723,460
COMBINATION INSIDE MICROMETER
AND INDICATOR
Filed June 15, 1953
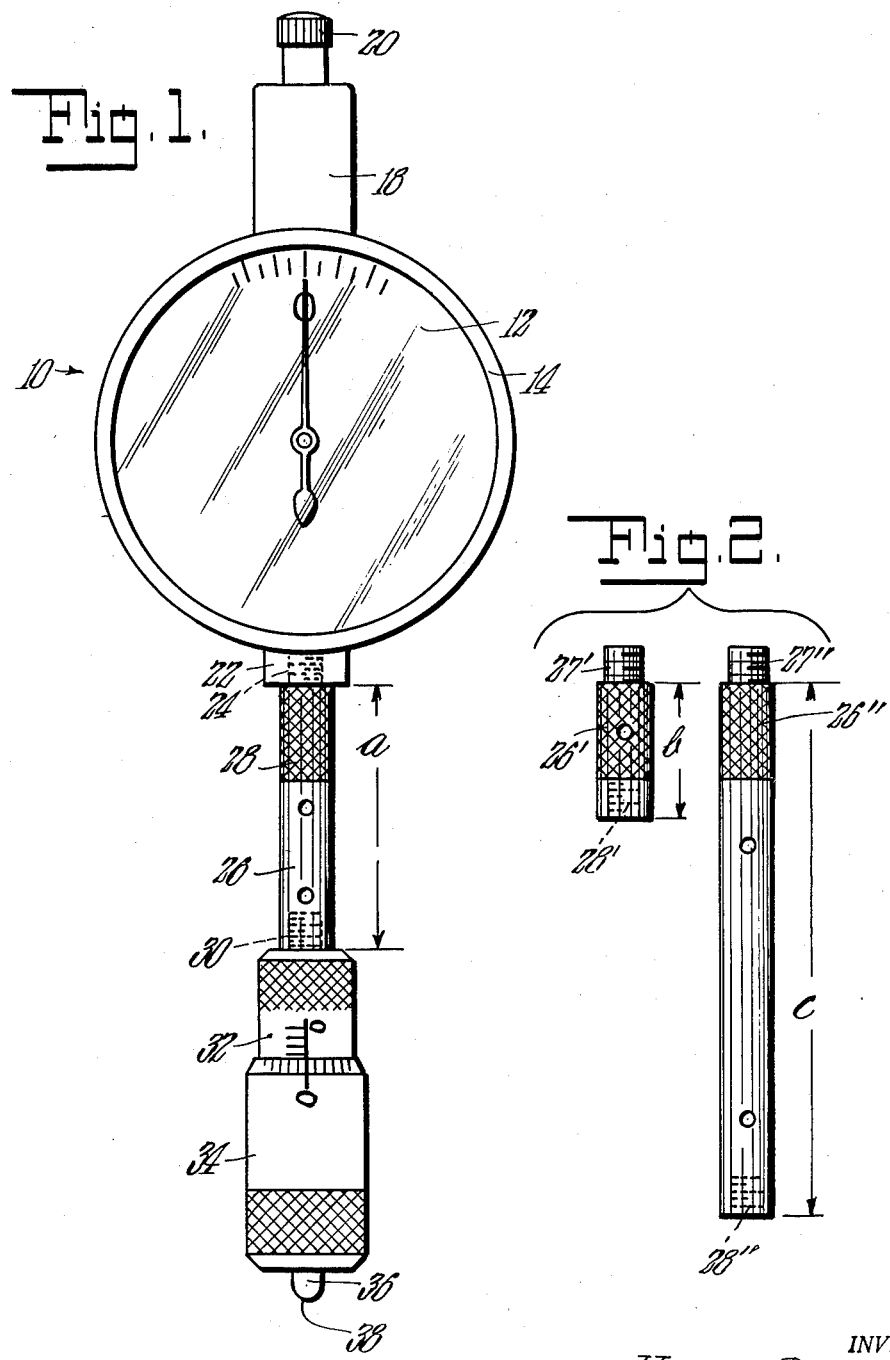
INVENTOR.
Howard Dewey Petch.
BY Roger Ross
Atty. & Agent United States Patent Office 2,723,460
Patented Nov. 15, 1955

2,723,460

COMBINATION INSIDE MICROMETER AND INDICATOR

Howard Dewey Petch, South Lynnfield, Mass.

Application June 15, 1953, Serial No. 361,650

1 Claim. (Cl. 33—147)

My invention relates to improvements in a combination inside micrometer and indicator used to measure internal dimensions and is directed more particularly to the provision of a unique construction of measuring device whereby present objectionable inconveniences are obviated, the device being one which will operate with a maximum amount of ease and with a minimum degree of effort.

In general, the object of my invention is to combine into a unitary structure an inside micrometer and an indicator whereby a single unit inside indicator measuring instrument is provided for the purpose of obtaining inside diameter measurements.

More specifically, the object is to so combine the inside micrometer and the indicator that when used as a single unit instrument, it will practically eliminate the possibility of operational error due to the various caused by the inaccuracy of the human touch when taking precision measurements.

This structure which facilitates the problem of taking accurate inside measurements is especially valuable in machine shop practice and other technical work.

In this invention, the end adjustability of gauging range or distance is obtained by means of supplemental extension rods used interchangeably with or in combination with each other and in association with a dial indicator cooperating therewith which gives fine readings within the limits of the length of the adjusting screw.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claim hereunto annexed and more fully described and referred to in connection with the accompanying drawings wherein:

Fig. 1 is a top plan view of the device of my invention; and

Fig. 2 is a top plan view of a pair of supplemental extension rods of my invention.

Referring now to the drawing more in detail, and referring more particularly to the preferred form of my invention selected for illustrative purposes, I have shown an indicator body member generally designated by 10 having a dial 12, a bezel 14, a pointer, a neck 18 extending radially outwardly from one side thereof, and a contact face 20 on the outer free end of the neck.

Diametrically opposite the neck 18 is a boss 22 extending outwardly from the side of the indicator body member and having a threaded bore 24 extending thereinto centrally of the boss from the outer free end thereof.

An extension sleeve 26 comprises an elongated cylindrical member of predetermined overall length having a male threaded portion at one extremity thereof and a female threaded portion at the opposite extremity thereof.

An annular portion 28 of the member 26 may be knurled if desired to facilitate manual engagement.

The male threaded portion of the member 26 is receivable in the threaded bore 24 of the boss 22.

The female threaded portion of the member 26 receives the male threaded stud 30 extending outwardly from the barrel 32 of the conventional micrometer head comprising the barrel and the sleeve 34, axial contact 36 and ground contact face 38.

Supplemental extension sleeves 26' and 26" such as shown in Fig. 2 are adapted to be separately attached to the boss 22 by means of male threaded portions 27' and 27" respectively which are receivable in the bore 24 at the will of the operator. The female threaded portions 28' and 28" respectively are each adapted to receive the stud 30 of the micrometer head whereby a combined micrometer head and indicator dial of a desired predetermined length may be obtained, it being appreciated that the overall lengths of the members 26, 26' and 26" are different from each other.

If desired, the extension sleeves 26, 26' and 26" may be combined in series. That is, they may be combined to each other in any desired combination to provide any desired length.

For example, member 26' may be combined with member 26", the threaded portion 27" being receivable in the threaded portion 28', the threaded portion 27' being receivable in the bore 24 and the stud 30 being receivable in the threaded portion 28" so as to make a unitary structure comprising the members 10, 26', 26" and the micrometer head. In this instance, as in all instances, members 20 and 38 serve as the measuring points of the combined inside micrometer and indicator.

It will be appreciated that the length of the member 26 from shoulder to shoulder may be of a certain predetermined length identified as $a$ in Fig. 1 and that the lengths of the members 26' and 26" will be of certain other predetermined lengths identified as $b$ and $c$ respectively so as to indicate clearly that the dimensions $a$, $b$ and $c$ are different from each other so as to provide utility for the tool for a variety of dimensions.

It will be appreciated, of course, that the extension members 26, 26' or 26" may be eliminated completely, the stud 30 of the micrometer head being threadedly receivable in the bore 24 of the boss 22, if desired.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Apparatus for measuring inside diameters including a dial indicator and a micrometer connected by an extension member, said indicator having a body provided with an outer elongated contact member and an inner boss at opposite sides thereof, said contact member having an outer contact face and said boss provided with a threaded socket in axial alignment with said elongated contact member, said micrometer having an elongated barrel provided with a threaded stud on the inner end thereof and a sleeve in threaded engagement with the outer end thereof, said sleeve having a contact on its outer end in alignment with the stud of the barrel and said contact having an outer contact face, said extension member having a threaded stud at one end in threaded engagement with the threaded socket of the boss of the indicator and provided on its opposite end with a threaded socket in which the threaded stud of the micrometer barrel is engaged.

References Cited in the file of this patent

UNITED STATES PATENTS

| | | |
|---|---|---|
| 536,676 | Wilcox | Apr. 2, 1895 |
| 2,030,864 | Gielow | Feb. 18, 1936 |
| 2,193,939 | Sanford | Mar. 19, 1940 |
| 2,344,595 | Calow | Sept. 22, 1942 |
| 2,357,898 | Kellan | Sept. 12, 1944 |
| 2,663,946 | Wojcik | Dec. 29, 1953 |

FOREIGN PATENTS

| | | |
|---|---|---|
| 28,854 | Great Britain | Oct. 2, 1896 |
| 584,526 | Great Britain | Jan. 16, 1947 |
| 971,605 | France | Jan. 19, 1951 |